W. S. HADAWAY, Jr.
ELECTRIC HEATING APPARATUS.
APPLICATION FILED JULY 31, 1915.
1,415,550.
Patented May 9, 1922.
2 SHEETS—SHEET 1.
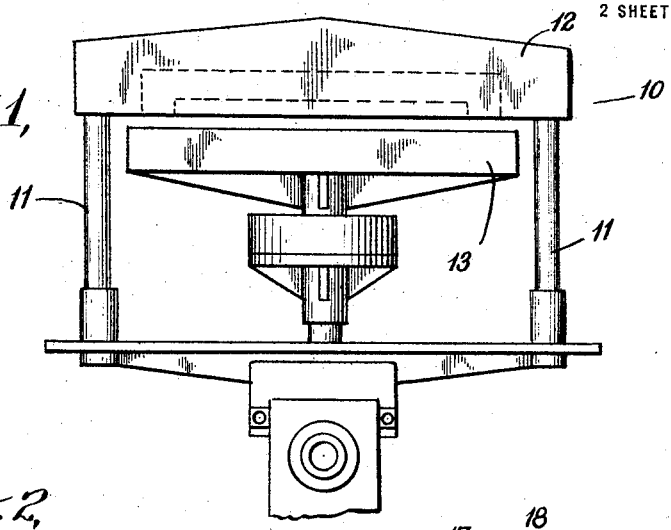
Fig. 1,
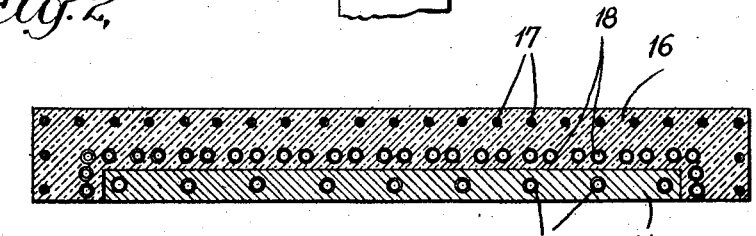
Fig. 2,
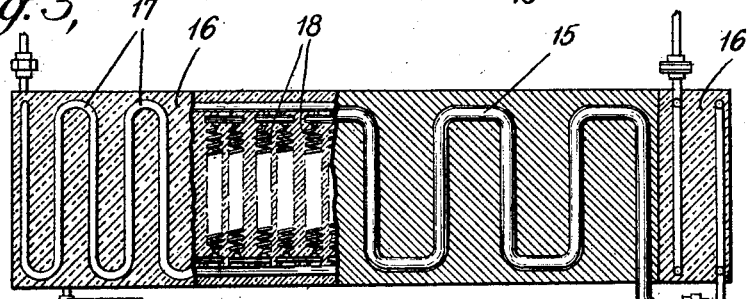
Fig. 3,
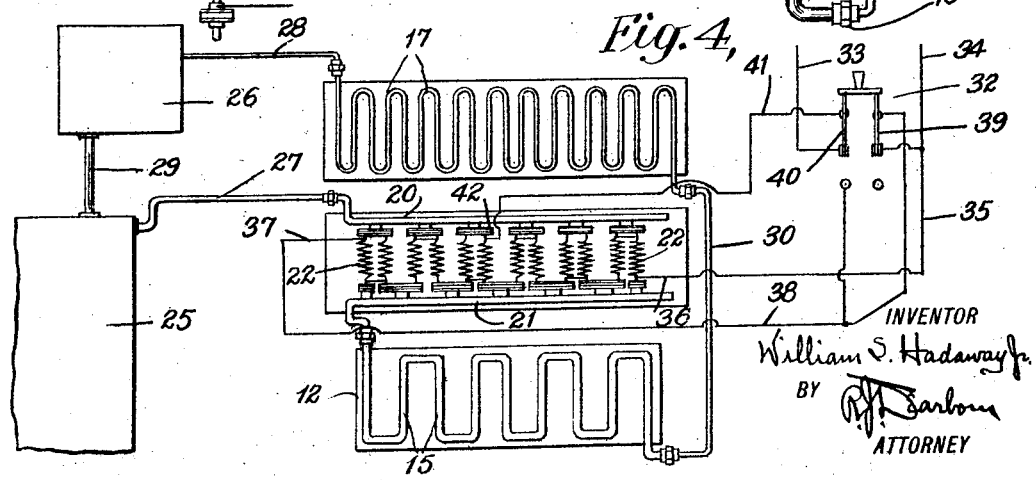
Fig. 4,
INVENTOR
William S. Hadaway Jr.
BY
ATTORNEY

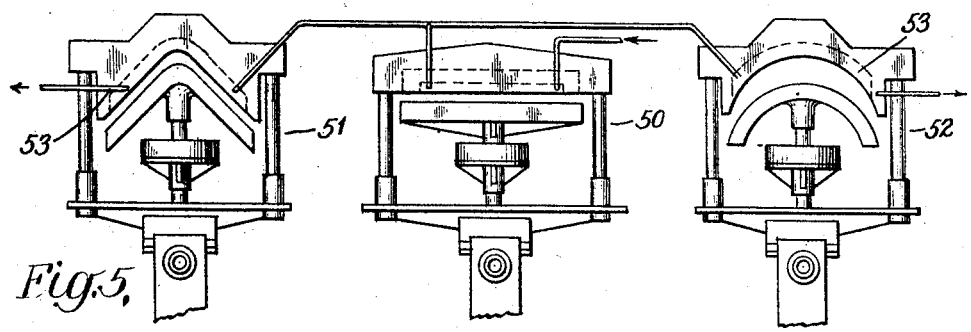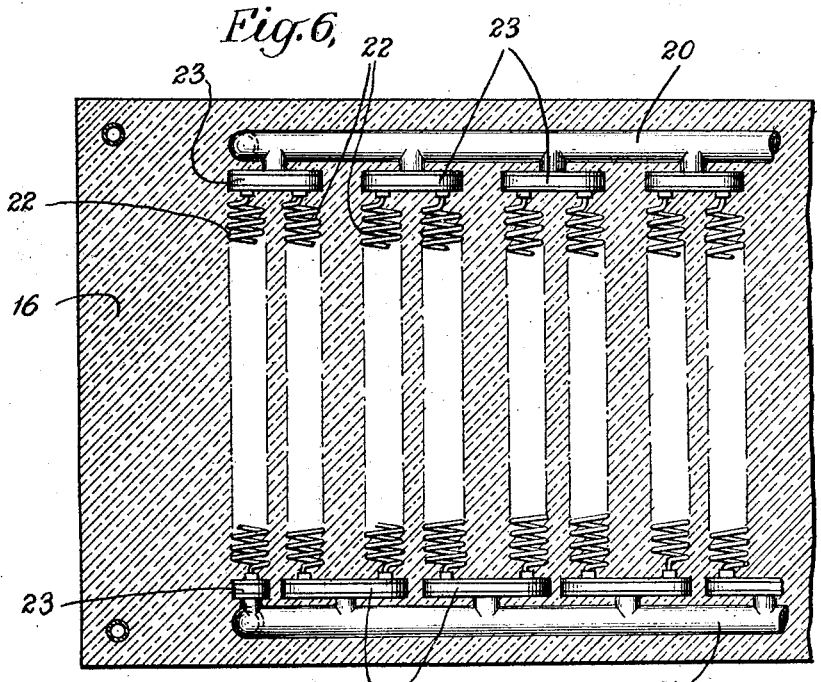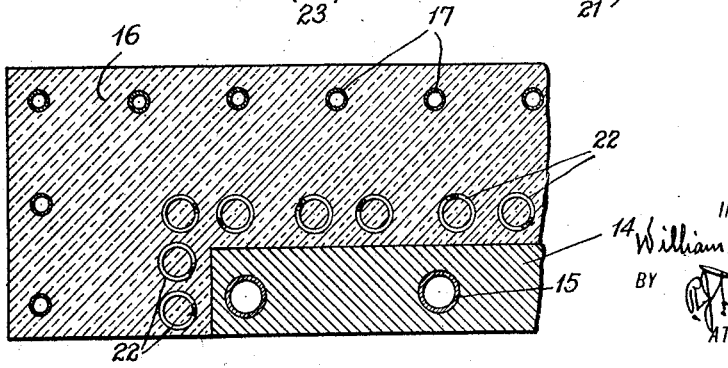

UNITED STATES PATENT OFFICE.

WILLIAM S. HADAWAY, JR., OF NEW ROCHELLE, NEW YORK.

ELECTRIC HEATING APPARATUS.

1,415,550.     Specification of Letters Patent.     Patented May 9, 1922.

Application filed July 31, 1915. Serial No. 42,934.

*To all whom it may concern:*

Be it known that I, WILLIAM S. HADAWAY, Jr., a citizen of the United States, and a resident of New Rochelle, county of Westchester, and State of New York, have invented certain new and useful Improvements in Electric Heating Apparatus, of which the following is a specification, reference being had to the accompanying drawings, forming a part thereof.

My invention relates to the generation, intensification and utilization of heat and has special reference to the electrical intensification of heat, in order to adapt it for service.

One object of my invention is to provide an electric heater that shall embody means for transferring its generated heat, to a place of usefulness, without passing through electric insulation, which is always a heat retarding barrier and usually a very good heat insulator.

Another object is to utilize the heat insulating material with which a heated body is provided, as a support for an electric heater so that it acts in the dual capacity of an electrical and a thermal insulation.

Another object is to provide an economical heating system that shall comprise a source of low temperature heat, such as, for example, a low pressure steam boiler or the exhaust steam from an engine, an internally-heated and thermally insulated heat intensifier such as an electrically energized superheater, and a heat emanant such as a press-head, plate, or block with a tortuous passage, a heating coil or the like.

Another object is to reduce the operating cost of electrically controlled heating systems or appliances and particularly such as are called upon to deliver relatively large quantities of useful heat. In other words, it has been my aim to secure the ready regulation and other advantages of the electric heater at a relatively small operating cost.

Another object is to provide a simple and particularly efficient, electrically energized superheater susceptible of use as an attachment to steam-heated apparatus of various patterns and kinds, without any essential structural re-arrangements or adaptation.

Another object is to obtain a substantially uniform distribution of heat in a body, without involving structural complications which are usually necessary when the electrical heating elements and insulators are incorporated in the body itself.

Another object is to provide an electrically energized and readily controlled means for supplying a plurality of individual machines with heat of desired intensity, particularly where the machines operate under similar conditions and are arranged in a group, whereby the expense and complication of individual heating and regulating appliances is avoided.

Another object is to provide a relatively light mechanical structure of small heat capacity which shall respond promptly to predetermined heat cycles.

Another object is to provide a drying press which shall be adapted to receive a supply of heat at a central point and distribute heat outwardly therefrom whereby the heated product, such as a matrix for example, will be dried from the centre outward, materially improved and completed in a relatively shorter time.

Another object is to provide an improved heat insulator that shall be arranged to support, and thermally insulate an electric heating element against external dissipation, that shall be adapted to be located adjacent to and preferably in close engagement with the body of a heat emanant which receives its heat from the heating element through the agency of steam or the like; and that shall embody a condensive passage to which the exhaust steam from the emanant is supplied. The heating element is preferably located in the insulator close to the emanant while the receiver passage is near the outer exposed surface of the insulator. By means of this arrangement the heat is very largely conserved and the insulator becomes a heated body, which effectively prevents the loss of heat from the emanator whose temperature is high. In other words, the difference in heat potential between the emanant and the adjacent body of insulation which protects its non working surface, is substantially reduced and the losses very materially diminished.

Other objects and advantages of my invention will be set forth hereinafter, and in order that my invention may be thoroughly understood I will now proceed to describe the same in the following specification and then point out the novel features thereof in appended claims.

Referring to the drawings:

Fig. 1 is a front elevation of a laundry press which is equipped with a heater arranged and constructed in accordance with my invention.

A longitudinal section of the heated press plate is shown on a larger scale in Fig. 2.

Fig. 3 is a plan view of the press plate with sections broken away to disclose the interior construction.

Fig. 4 is a diagrammatic view of a complete heating system which embodies my invention.

Another arrangement of my invention is illustrated in Fig. 5 in which a single electrical heater is utilized in connection with a group of heated working members mounted on several machines.

The heater apart from the machine is shown in detail in Figs. 6 and 7, Fig. 6 being a sectional plan view and Fig. 7 a sectional elevation of one end of the heater of Fig. 2 drawn to a larger scale.

The superheater which forms a part of my invention may constitute an attachment and may be readily applied to steam-heated apparatus of well known forms, with the result that the steam requirements and in fact the operation of the system is completely changed and improved, and its economy and efficiency very greatly enhanced.

While I have shown my invention in connection with a laundry apparatus, it is obviously not restricted in this regard and may be applied to devices of various kinds. It is, for example, adapted for use with a matrix bed or type-setting machine melting pot.

In the drawings, 10 represents a frame of the laundry machine having uprights 11, and a stationary top plate or inverted bed 12 which co-operates with a movable pressure plate 13. The pressure plate 13 is arranged to be moved into and out of engagement with the inverted bed 12 in a well known manner the bed being heated as hereinafter explained.

The stationary bed 12 comprises a pressure plate 14 in which a tube 15 is cast, a body 16 of insulating material having a condenser tube 17 embedded in it near its outer surfaces and a tubular resistor 18 adjacent to the pressure plate 14. The tube 15 in the pressure plate is bent into a zigzag form as clearly shown in Figs. 3 and 4 and is intended to represent any suitable distributed passage which is adapted to receive superheated steam. The condenser tube 17 may also be of zigzag form and is connected by a union 19 to one end of the tube 15.

The tubular resistor 18 as indicated in Fig. 2 and as shown in detail in Fig. 6, preferably comprises a pair of spaced headers 20 and 21 between which are interposed a plurality of helical units 22. Each of these units consists of a relatively small tube of high resistance material capable of operating at a very high temperature; for example, a nickel-chromium alloy may be used for this purpose.

These units may be arranged in zigzag form with their ends paired and connected through electrically insulated joints 23 to the headers 20 and 21, the arrangement of parts being such that a plurality of parallel vapor passages are established between the headers while the units 22 are insulated from the headers and are electrically connected in series relation. Any suitable electrical connections may, of course, be established.

Referring to the diagram of Fig. 4, 25 represents a boiler or other source of low temperature vapor, 26 a receiver for the water of condensation and 27 and 28, suitable pipes which respectively connect the boiler or source 25 to the header 20, and the receiver 26 to one end of the condenser 17. A pipe 29 connects the receiver to the boiler.

The steam circuit is established from the boiler to pipe 27 to header 20, from this point through a plurality of passages established through the units 22 to the header 21. Thence through the tube 15 in the press plate 12, through a pipe 30, condenser 17 and pipe 28 to the receiver 26.

The press plate which constitutes the working member has the tube or passage 15 embodied in it and may be termed a heat emanant or radiator although the heat may obviously be dissipated therefrom by either radiation, convection or conduction.

In order to indicate that the heat generated electrically in the resistor units 22 may be adjusted or varied as desired, I have shown a control switch 32, which is adapted to occupy either one of two positions and is adapted to connect the units either in series or series-multiple relation.

Conductors 33 and 34 represent a supply circuit.

Assuming that the switch 32 occupies the position in which it is shown, energy is supplied from conductor 34 through a conductor 35 to one terminal 36 of the resistor units which are connected in series relation, the opposite terminal 37 of the units being connected through a conductor 38 and switch blade 39 to the same supply circuit terminal. The opposite supply circuit terminal 33 is connected to switch blade 40 and conductor 41 to an intermediate terminal 42 of the resistor, thus with the switch in this position the units are connected in series-multiple relation. If the switch 32 is thrown to its opposite position, the supply circuit terminal 34 is still connected to the terminal 36, but the circuit terminal 33 is disconnected from the terminal 42 and is connected to the terminal 37, a series relation being thus established.

The temperature produced directly by low pressure or exhaust steam is not usually sufficient for a laundry press and for various other devices and it has been found necessary in many cases to utilize either live steam at a relatively high pressure for this purpose or gas or electrically heated bed plates or blocks. None of these expedients can be resorted to satisfactorily and economically under ordinary commercial conditions and it is one of the objects of my invention to provide a heater which shall make the use of either high pressure live steam, or a relatively large quantity of electric energy unnecessary.

In operation, the low pressure steam is supplied from a boiler 25 to the header 20 and as it passes through the tubular resistor units, it is electrically superheated to a relatively high temperature, the heat which is electrically generated in the resistor tubes is very largely absorbed by the steam and what little heat is not absorbed is transferred directly to the insulating body 16. The result is that the insulating body, particularly that portion adjacent to the press plate or radiator 14 is maintained at a moderate temperature which is between the temperature of the radiator and the temperature of the surrounding air and consequently very materially reduces the loss of heat from the radiator.

The superheated steam gives up its heat to the emanant particularly when the emanant is operatively in engagement with a relatively cold wet object and the hot water leaving the emanant passes into the receiver 17, which is near the exposed surfaces of the insulating block 16. After the water passes through the receiver passage 17 it is returned to the receiver 26. The insulating body receives heat from the water of condensation in the receiver passage and therefore the loss of heat by radiation from the insulating body is largely avoided. Thus the insulating body which is adjacent to the emanant and is intended to conserve the heat therein, is itself heated to a higher temperature near the emanant by the resistor which is embedded in it and to a lower temperature near its exposed surfaces by the water of condensation in the receiver or return passage. The result of this arrangement is an increased economy, the temperature of the parts of the device being graded from the high temperature emanant to the low temperature exposed surfaces.

The loss of heat not only from the emanant but also from the resistor is thus minimized. The working member or emanant is insulated by a heated body of insulation.

As hereinbefore pointed out the electric energy may be varied to regulate the heat delivered to the working member and it is evident that the steam flow may be governed in any suitable manner to insure that the heat is absorbed by the working member and that only hot water is delivered to the receiver. In the embodiment of my invention which is particularly illustrated and described, each of the units 22 consists of a relatively small tube which is adapted to be maintained at a very high temperature. Under these conditions the quantity of steam drawn from the source is very materially reduced and in fact by varying the temperature of the electric resistor tubes as already described, the steam flow is automatically regulated.

It is conceivable that it might be highly uneconomical to supply heat to steam which is permitted to flow freely through a working member since a great deal of heat might be carried through the working member and not released. This condition cannot exist if the flow of steam is properly governed and a very effective way of governing the steam flow is by utilizing a very highly heated tubular member for imparting heat to the steam since by this means the flow of steam is automatically retarded. This is evidently the case since the pressure in the apparatus is substantially uniform and is relatively low, and consequently the volume of the steam as it is heated is enormously increased so that only a small quantity of steam is drawn from the source.

On the other hand, the heat is rapidly released at the working member and the volume of the steam is quickly reduced, and consequently the amount of hot water delivered to the receiver is proportionately very small.

Of course the apparatus may be arranged and proportioned in various ways but care should of course be taken to insure that as far as possible the heat is released at the working member.

Referring to Fig. 5, I have shown a laundry press 50, which is similar to the press 10 of Fig. 1 and is similarly equipped, in a group with two other machines 51 and 52, each of which is provided with a press plate 53 having the usual steam passage. The resistor or electrical superheater of the press 50 is connected not only to its own press plate or radiator, but is also connected to the press plates or radiators 53 of the machines 51 and 52, thus a single superheater may be employed for a group of machines.

An arrangement of this kind possesses a number of advantages which will be readily understood by those familiar with this art. For example, a number of machines already in use on a steam heating system may be readily converted so as to operate on superheated steam, a single superheater serving a group of machines.

The mass of insulation which surrounds the superheater or booster and prevents loss of heat therefrom is large relative to the mass of the booster itself which is small. This preferred arrangement is clearly illustrated in Figure 2 of the drawing and the insulating mass has a large heat capacity while the booster or superheater has a relatively small heat capacity so that it is instantly heated to a high temperature when electrically energized.

Attention is also directed to the fact that the insulating mass is mechanically reinforced and strengthened by the low temperature heating coils 17 which receive the vapor discharge from the working member. The location of the coils 17 near the outer surface of the insulating mass enhances the value of the coil as a mechanical reinforcement. The advantages of thus strengthening the insulating mass which is comparatively destructible if made of the usual commercial materials, will be clearly understood by those skilled in this art.

It is furthermore evident that while it is preferable to have the superheater closely associated with the radiator, this arrangement is not essential to my invention and a superheater may be formed to constitute an attachment and connected to a working member or radiator of any suitable form and for any desired purpose.

A system of machines may be heated by supplying superheated steam from a central source or boiler and superheater which may be heated in any suitable way as by coal and gas respectively and the electrical superheater of my invention used at one or more points on the line to maintain uniform conditions or for otherwise regulating the system.

My invention is particularly well adapted for use and shows the greatest economy when used in connection with a relatively low pressure steam system, although its usefulness is not limited to either a low or high pressure steam system and I intend that only such limitations be imposed as are indicated in the appended claims.

What I claim is:

1. The combination with a source of relatively low pressure steam, a radiator, a tubular distributing member interposed between the radiator and said source, heat insulation for the distributing member, and means for generating heat within the insulation to determine the temperature of the steam at the radiator.

2. The combination with a source of relatively low pressure steam, a radiator and a tubular resistor interposed between the radiator and said source, and means for electrically and thermally insulating the resistor, whereby the heat generated in the resistor is imparted to the steam within it.

3. A superheater comprising a tubular resistor adapted to carry steam and arranged to have an electric current passed therethrough, and a mass of material having both electrical and thermal insulating qualities adapted to insulate the tube electrically and to prevent the external radiation of heat from the tube, whereby the heat generated in the resistor is taken up by the steam therein.

4. A heating system comprising a radiator, an electrically energized superheater embodying a vapor passage connected to the radiator, means for preventing the exterior dissipation of heat from the superheater, and means for supplying vapor to the passage of the radiator.

5. A heating system comprising a radiator, a superheater having a steam passage connected to the radiator, an electric heater for raising the temperature of the steam in the passage, and means for preventing the external dissipation of heat from the superheater.

6. A heating system comprising a radiator, a superheater having a tubular resistor constituting a vapor passage connected to the radiator, and means for preventing the external dissipation of heat from the tubular resistor.

7. A heater comprising a body having a vapor passage and a superheater adapted to be associated with the body and comprising a tubular resistor, and means for preventing the external dissipation of heat from the resistor.

8. A heater comprising a body having a tortuous vapor passage and a superheater adapted to be associated with the body and comprising a tubular resistor, and means for preventing the external dissipation of heat from the resistor, whereby the heat generated in the superheater is transferred to the radiator.

9. An electric, vapor heater comprising a working body having a vapor passage, a heat insulating body protecting the inactive surfaces of the working body, a tubular resistor embedded in the insulating body adjacent to the working body adapted to receive relatively low temperature vapor and electric energy for superheating the same, and a condenser passage in the insulating body near its exposed surfaces, said vapor passage in the working body being interposed between the resistor tube and the condenser passage.

10. An electric, vapor heater comprising a radiator having a vapor passage, a heat insulating body protecting the inactive surface of the radiator, means in the insulating body adjacent to the radiator adapted to receive and to superheat relatively low temperature vapor, and a condenser passage in the insulating body near its exposed surfaces, said radiator being interposed between said means and said condenser passage.

11. An electric, vapor heater comprising a radiator having a vapor passage, a heat insulating body protecting the inactive surface of the radiator, means in the insulating body adjacent to the radiator adapted to receive and to superheat relatively low temperature vapor, said insulating body being adapted to be heated by said superheating means to an intermediate temperature between that of the radiator and that of the surrounding medium.

12. An electric, vapor heater comprising a working body and a vapor passage, a heat insulating body associated with the working body, an electro-responsive superheater in said insulating body, adapted to deliver superheated vapor to the working body.

13. An electric, vapor heater comprising a working body and a vapor passage, a heat insulating body associated with the working body, an electro-responsive superheater, in said insulating body, adapted to deliver superheated vapor to the working body and to maintain the insulating body at an intermediate temperature between that of the working body and that of the surrounding medium.

14. An electric, vapor heater comprising a working body having a vapor passage, a heat insulating body associated with the working body, a tubular resistor embedded in the insulating body and connected to the vapor passage in the working body.

15. An electric, vapor heater comprising a working body having a vapor passage, a heat insulating body associated with the working body, a tubular resistor embedded in the insulating body and connected to the vapor passage in the working body, said tubular resistor being adapted to receive relatively low temperature vapor and electric energy for superheating the vapor whereby the working body is supplied with high temperature vapor and the insulating body is heated to an intermediate temperature between that of the working body and that of the surrounding medium.

16. An electric, vapor heater comprising a working member having a vapor passage, a heat insulating body associated with the working member, a tubular resistor embedded in the insulating body adjacent to the working member and a receiver tube in the insulating body near its exposed surfaces, said vapor passage in the working member being interposed between the tubular resistor and the receiver tube.

17. An electric, vapor heater comprising a working member having a vapor passage, a heat insulating body associated with the working member, a vapor passage in the insulating body adjacent to the working member, a resistor adapted to superheat the vapor in the vapor passage in the insulating body and a receiver tube in the insulating body near its exposed surfaces, said vapor passage in the working member being interposed between the superheater passage and the receiver tube.

18. A heater comprising a working member to be supplied with heat, a source of relatively low temperature heat, and translating means for electrically intensifying the heat supplied to the working member.

19. A heater comprising an insulating body, an electrical heat generator imbedded therein and having a passage for a relatively low temperature heating medium.

20. A heater comprising an insulating body, an electrical heat generator imbedded therein and having a passage, and means for supplying low temperature steam to the passage.

21. A heater comprising an insulating body, an electrical heat generator imbedded therein and having a passage, means for supplying low temperature steam to the passage, and means for supplying heat to the insulation.

22. Heat insulation means for a relatively high temperature working member comprising a body of insulating material having means therein for supplying a relatively low temperature heat thereto, the temperature of the working member being maintained independently of the heating means in the insulating material.

23. An electric heater comprising a resistor element, means for receiving heat therefrom, thermal and electrical insulation for the resistor element, and means in the insulation for supplying heat thereto.

24. An electric heater comprising a resistor element, means for receiving heat therefrom, thermal and electrical insulation for the resistor element, and means for supplying relatively low temperature heat to the insulation near the exposed surfaces thereof.

25. An electric heater comprising a resistance conductor, thermal and electric insulation surrounding the resistor, and means for transferring therefrom the heat generated in the resistor without passing through the insulation.

26. A heating system comprising a working member adapted to receive high temperature steam, a source of relatively low temperature steam, and an electrical attachment for said working member for intensifying the heat of the steam as it is supplied to the working member.

27. A heating system comprising a plurality of independent working members adapted to be supplied with high temperature steam, a single source of low temperature steam, and a single means for intensifying the heat supplied from said source to the working members.

28. A heating system comprising a plurality of independent working members adapted to be supplied with high temperature steam, a single source of low temperature steam, and a single electric heater for intensifying the heat of the steam supplied from said source to the working members.

29. A heater comprising a working member, means for insulating the working member, and means for supplying heat at a relatively low temperature to the insulating material to reduce the loss of heat from the working member.

30. A heater comprising a working member having a passage for heating vapor, thermal insulating material for the working member embodying a passage which is adapted to receive the exhaust vapor from the working member.

31. A heater comprising a body having a passage for heating vapor, heat insulation for protecting the working member and a tortuous condensation passage in the insulation adapted to receive exhaust vapor from the working member.

32. A heater comprising a body having a plurality of zones, and means for supplying heat at graded temperatures to the zones to reduce the loss of heat from the high temperature zone of the body.

33. The combination with a source of steam, a tubular distributor therefor, and means for imparting heat to the distributor to thereby decrease the flow of steam therethrough.

34. The combination with a source of steam, a radiator, an interposed tubular distributor, and means for imparting heat to the distributor to regulate the flow of steam and determine the heat transferred thereby to the radiator.

35. The combination with a source of steam, a tubular distributor therefor, a source of electric energy connected to the tubular distributor, and means for regulating the flow of current therein to regulate the flow of steam therethrough.

36. The combination with a source of steam, a working member, an interposed distributing passage, an electric heater for imparting heat to the steam in the passage, and means for regulating the heater to determine the flow of steam through the passage and the heat transferred to the working member.

37. Electric heating apparatus comprising a working member, a mass of heat insulation having a relatively large heat capacity arranged to protect the inactive exposed surfaces of the working member, a vapor heater having a small heat capacity disposed in the insulation adjacent to the working member, and means for supplying heat to the insulating mass independently of the vapor heater.

38. A vapor heater or booster comprising a tubular body having small heat capacity, means for generating heat in the tubular body, an insulating mass of large heat capacity surrounding the vapor heater, and means independent of the aforesaid heat generating means for supplying heat to the large capacity mass of heat insulation.

39. A heating apparatus comprising a large capacity mass of heat insulation, a vapor heater or booster disposed therein, and means for supplying heat to the insulation and for mechanically reinforcing the insulating mass.

40. A heating apparatus comprising a large capacity mass of heat insulation, a vapor heater or booster disposed therein, and vapor receiving coils disposed in the insulation near the outer surface thereof and arranged to mechanically reinforce the insulation and supply low temperature heat thereto.

41. A unitary heating and insulating structure having heat generating means and a tubular member disposed therein adapted to be supplied with energy from two sources simultaneously, and a working member associated with the heating and insulating structure and adapted to receive high temperature heat from the tubular member therein.

42. Heating apparatus comprising a working element to which high temperature heat is adapted to be supplied, a unitary heating and insulating structure partially surrounding the working member and arranged to protect the inactive surfaces thereof, said heating and insulating structure comprising an electric heat generating element adapted to receive warm vapor and deliver it at high temperatures to the working member.

43. In a heater, a working member, a radiator spaced apart therefrom, a mass of insulating material intermediate to and in intimate contact with the member and the radiator, a tubular resistor imbedded in said mass and means for conducting hot vapor through said resistor, working member and radiator in sequential order, whereby said resistor controls the temperature of the working member, and the radiator controls the temperature of the insulating mass.

44. In a heater, a working member, a tubular conductor for transferring a heated medium to said member and to retard the flow of the medium, and heat generating means for heating said tubular conductor to cause the conductor to further retard the flow of the medium.

45. In a heater, a working member, a tubular conductor for transferring a heated medium to said member and to retard the flow of the medium, heat generating means for heating said tubular conductor to cause the conductor to further retard the flow of the medium and control means for varying the degree of retardation.

46. In a heater, a working member, means for conducting a heated medium to said member, automatic means for throttling said medium comprising a tortuous, restricted tube having walls expandible by heat to restrict the flow of medium and means for applying heat thereto.

In witness whereof, I have hereunto set my hand this 28th day of July, 1915.

WILLIAM S. HADAWAY, Jr.